US009246789B2

(12) United States Patent
Tanaka et al.

(10) Patent No.: US 9,246,789 B2
(45) Date of Patent: Jan. 26, 2016

(54) TESTING APPARATUS AND TEST DISPLAY METHOD

(71) Applicants: Junya Tanaka, Atsugi (JP); Yasuyuki Matsuyama, Atsugi (JP); Takuma Goto, Atsugi (JP)

(72) Inventors: Junya Tanaka, Atsugi (JP); Yasuyuki Matsuyama, Atsugi (JP); Takuma Goto, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 155 days.

(21) Appl. No.: 14/138,477

(22) Filed: Dec. 23, 2013

(65) Prior Publication Data

US 2014/0215281 A1   Jul. 31, 2014

(30) Foreign Application Priority Data

Jan. 25, 2013  (JP) .................................. 2013-012199

(51) Int. Cl.
*G01R 31/28* (2006.01)
*H04L 12/26* (2006.01)
*H04W 24/06* (2009.01)

(52) U.S. Cl.
CPC ............... *H04L 43/50* (2013.01); *H04W 24/06* (2013.01)

(58) Field of Classification Search
CPC .............................. H04L 43/50; H04W 24/06
See application file for complete search history.

(56) References Cited

U.S. PATENT DOCUMENTS

| | | | |
|---|---|---|---|
| 6,421,793 B1* | 7/2002 | Lester et al. | 714/37 |
| 2010/0146489 A1* | 6/2010 | Ortiz | 717/128 |

FOREIGN PATENT DOCUMENTS

JP    2009-147640    7/2009

* cited by examiner

*Primary Examiner* — Sam Rizk
(74) *Attorney, Agent, or Firm* — Greer Burns & Crain Ltd.

(57) ABSTRACT

A testing apparatus includes a scenario processing unit that executes a test scenario for operating the testing apparatus to imitate the operation of a base station, a communication unit capable of transmitting and receiving a message to and from a mobile communication terminal, a layer processing unit for processing a message for each layer, a log data storing unit for storing log data indicating transmission of messages between the layers, and a display controller for creating a transmission schedule based on the extracted data associated with system information and causing a display unit to display the transmission schedule. The transmission schedule is written in a tabular form in which a block type of the system information is displayed at a position to which a frame for transmitting the system information is allocated.

12 Claims, 11 Drawing Sheets

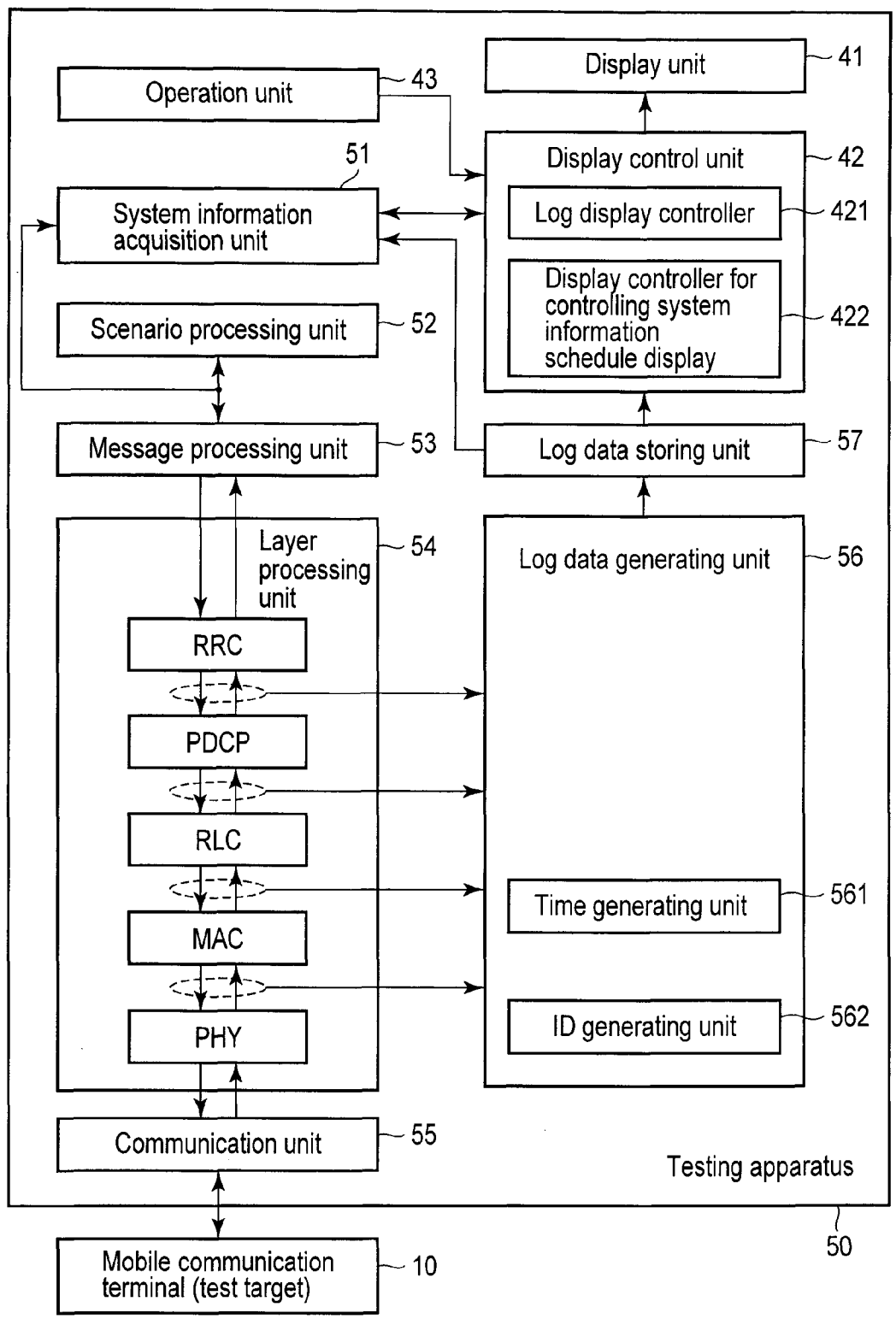
F I G. 1

FIG. 4

| Frame No. | 0 | 2 | 4 | 6 | 8 | 10 | 12 | 14 |
|---|---|---|---|---|---|---|---|---|
| Block Type | MIB | SB1 | SIB1 | SIB3 | MIB | SIB5 | SIB5 | SIB5 |
| Frame No. | 16 | 18 | 20 | 22 | 24 | 26 | 28 | 30 |
| Block Type | MIB | SB1 | SIB7 | SIB11 | MIB | SIB11 | SIB11 | SIB11 |
| Frame No. | 32 | 34 | 36 | 38 | 40 | 42 | 44 | 46 |
| Block Type | MIB | SB1 | SIB1 | SIB3 | MIB | SIB5 | SIB5 | SIB5 |
| Frame No. | 48 | 50 | 52 | 54 | 56 | 58 | 60 | 62 |
| Block Type | MIB | SB1 | SIB11 | SIB11 | MIB | SIB11 | SIB11 | SIB11 |
| Frame No. | 64 | 66 | 68 | 70 | 72 | 74 | 76 | 78 |
| Block Type | MIB | SB1 | SIB1 | SIB3 | MIB | SIB5 | SIB5 | SIB5 |
| Frame No. | 80 | 82 | 84 | 86 | 88 | 90 | 92 | 94 |
| Block Type | MIB | SB1 | SIB7 | SIB19 | MIB | SIB19 | SIB19 | SIB19 |
| Frame No. | 96 | 98 | 100 | 102 | 104 | 106 | 108 | 110 |
| Block Type | MIB | SB1 | SIB1 | SIB3 | MIB | SIB5 | SIB5 | SIB5 |
| Frame No. | 112 | 114 | 116 | 118 | 120 | 122 | 124 | 126 |
| Block Type | MIB | SB1 | SIB19 | SIB19 | MIB | SIB19 | SIB19 | SIB19 |

| Block Type | MIB | SB1 | SIB1 | SIB3 | SIB5/SIB5bis | SIB7 | SIB11 | SIB19 |
|---|---|---|---|---|---|---|---|---|
| SIB_REP | 8 | 16 | 32 | 32 | 32 | 64 | 128 | 128 |
| SEG_COUNT | 1 | 1 | 1 | 1 | 3 | 1 | 9 | 9 |
| SIB_POS | 0 | 1 | 2 | 3 | 5,6,7 | 10 | 11,13,14,15, 26,27,29,30, 31 | 43,45,46,47, 58,59,61,62, 63 |

| Frame No. | 0 | 2 | 4 | 6 | 8 | 10 | 12 | 14 |
|---|---|---|---|---|---|---|---|---|
| Block Type | MIB | SB1 | SIB1 | SIB3 | MIB | SIB5 | SIB5 | SIB5 |
| Frame No. | 16 | 18 | 20 | 22 | 24 | 26 | 28 | 30 |
| Block Type | MIB | SB1 | SIB7 | SIB11 | MIB | SIB11 | SIB11 | SIB11 |
| Frame No. | 32 | 34 | 36 | 38 | 40 | 42 | 44 | 46 |
| Block Type | MIB | SB1 | SIB1 | SIB3 | MIB | SIB5 | SIB5 | SIB5 |
| Frame No. | 48 | 50 | 52 | 54 | 56 | 58 | 60 | 62 |
| Block Type | MIB | SB1 | SIB11 | SIB11 | MIB | SIB5 | | |
| Frame No. | 64 | 66 | 68 | 70 | 72 | 74 | 76 | 78 |
| Block Type | MIB | SB1 | SIB1 | SIB3 | MIB | SIB5 | SIB5 | SIB5 |
| Frame No. | 80 | 82 | 84 | 86 | 88 | 90 | 92 | 94 |
| Block Type | MIB | SB1 | SIB7 | | MIB | | SIB5 | |
| Frame No. | 96 | 98 | 100 | 102 | 104 | 106 | 108 | 110 |
| Block Type | MIB | SB1 | SIB1 | SIB3 | MIB | SIB5 | SIB5 | SIB5 |
| Frame No. | 112 | 114 | 116 | 118 | 120 | 122 | 124 | 126 |
| Block Type | MIB | SB1 | | SIB19 | MIB | SIB19 | SIB19 | |

One row, One column — 100

F I G. 6

| Block Type | MIB | SB1 | SIB1 | SIB3 | SIB5/SIB5bis | SIB7 | SIB11 | SIB19 |
|---|---|---|---|---|---|---|---|---|
| SIB_REP | 8 | 16 | 32 | 32 | 32 | 64 | 128 | 128 |
| SEG_COUNT | 1 | 1 | 1 | 1 | 3 | 1 | 6 | 3 |
| SIB_POS | 0 | 1 | 2 | 3 | 5,6,7 | 10 | 11,13,14,15, 26,27 | 59,61,62 |

FIG. 7

| Frame No. | 0 | 2 | 4 | 6 | 8 | 10 | 12 | 14 |
|---|---|---|---|---|---|---|---|---|
| Block Type | MIB | SB1 | SIB1 | SIB3 | MIB | SIB5 | SIB5 | SIB5 |

| Frame No. | 16 | 18 | 20 | 22 | 24 | 26 | 28 | 30 |
|---|---|---|---|---|---|---|---|---|
| Block Type | MIB | SB1 | SIB7 | SIB11 | MIB | SIB11 | SIB11 | SIB11 |

| Frame No. | 32 | 34 | 36 | 38 | 40 | 42 | 44 | 46 |
|---|---|---|---|---|---|---|---|---|
| Block Type | MIB | SB1 | SIB1 | SIB3 | MIB | SIB5 | SIB5 | SIB5 |

| Frame No. | 48 | 50 | 52 | 54 | 56 | 58 | 60 | 62 |
|---|---|---|---|---|---|---|---|---|
| Block Type | MIB | SB1 | SIB11 | SIB11 | MIB | SIB11 | SIB11 | SIB11 |

| Frame No. | 64 | 66 | 68 | 70 | 72 | 74 | 76 | 78 |
|---|---|---|---|---|---|---|---|---|
| Block Type | MIB | SB1 | SIB1 | SIB3 | MIB | SIB5 | SIB5 | SIB5 |

| Frame No. | 80 | 82 | 84 | 86 | 88 | 90 | 92 | 94 |
|---|---|---|---|---|---|---|---|---|
| Block Type | MIB | SB1 | SIB7 | SIB19 | MIB | SIB19 | SIB19 | SIB19 |

| Frame No. | 96 | 98 | 100 | 102 | 104 | 106 | 108 | 110 |
|---|---|---|---|---|---|---|---|---|
| Block Type | MIB | SB1 | SIB1 | SIB3 | MIB | SIB5 | SIB5 | SIB5 |

| Frame No. | 112 | 114 | 116 | 118 | 120 | 122 | 124 | 126 |
|---|---|---|---|---|---|---|---|---|
| Block Type | MIB | SB1 | SIB19 | SIB19 | MIB | SIB19 | SIB19 | SIB19 |

| Frame No. | Block Type |
|---|---|
| 0 | MIB |
| 2 | SB1 |
| 4 | SIB1 |
| 6 | SIB3 |
| 8 | MIB |
| 10 | SIB5 |
| 12 | SIB5 |
| 14 | SIB5 |
| 16 | MIB |
| 18 | SIB1 |
| 20 | SIB7 |
| 22 | SIB11 |
| 24 | MIB |
| 26 | SIB11 |
| 28 | SIB11 |
| 30 | SIB11 |

| Frame No. | Block Type |
|---|---|
| 32 | MIB |
| 34 | SB1 |
| 36 | SIB1 |
| 38 | SIB3 |
| 40 | MIB |
| 42 | SIB5 |
| 44 | SIB5 |
| 46 | SIB5 |
| 48 | MIB |
| 50 | SIB1 |
| 52 | SIB11 |
| 54 | SIB11 |
| 56 | MIB |
| 58 | SIB11 |
| 60 | SIB11 |
| 62 | SIB11 |

| Frame No. | Block Type |
|---|---|
| 64 | MIB |
| 66 | SB1 |
| 68 | SIB1 |
| 70 | SIB3 |
| 72 | MIB |
| 74 | SIB5 |
| 76 | SIB5 |
| 78 | SIB5 |
| 80 | MIB |
| 82 | SIB1 |
| 84 | SIB7 |
| 86 | SIB19 |
| 88 | MIB |
| 90 | SIB19 |
| 92 | SIB19 |
| 94 | SIB19 |

| Frame No. | Block Type |
|---|---|
| 96 | MIB |
| 98 | SB1 |
| 100 | SIB1 |
| 102 | SIB3 |
| 104 | MIB |
| 106 | SIB5 |
| 108 | SIB5 |
| 110 | SIB5 |
| 112 | MIB |
| 114 | SIB1 |
| 116 | SIB19 |
| 118 | SIB19 |
| 120 | MIB |
| 122 | SIB19 |
| 124 | SIB19 |
| 126 | SIB19 |

```
/* Send Message : SIB5-1 */
{
    UCHAR SndData[ ] = {
        0x00, 0x02, 0x52, 0x05, 0x6c, 0x3a, 0xff,  0xff,
        0x43, 0xff,  0xfc, 0x52, 0x10, 0xf0, 0x29, 0x0c,
        0x0a, 0x80, 0x18, 0x00, 0x0c, 0x8f, 0xf7, 0xb1,
        0x7e, 0xe1, 0x0f, 0xf0, 0c00, 0x00, 0x3c
    };
    SIB_POS = 6;     ⎞
    SIB_REP = 32;    ⎠ A
    SndMessage( UNIT_BTS1, RLC_TR_DATA_REQ, D_BCCH, 0, SndData, sizeof(SndData));
    SequenceDisp( "send 'SIB5-1' ");
};

/* Send Message: SIB5-2 */
{
    UCHAR SndData[ ] = {
        0x00, 0x04, 0x05, 0xcd, 0x91, 0xff,  0xc0, 0xc8,
        0x08, 0x0e, 0x04, 0x21, 0x82, 0x04, 0x00, 0x22,
        0x19, 0x0a, 0x64, 0x29, 0x40, 0x06, 0x02, 0x22,
        0xe5, 0x60, 0x40, 0x03, 0xc6, 0x30, 0x40
    };
    SIB_POS = 10;    ⎞
    SIB_REP = 32;    ⎠ B
    SndMessage( UNIT_BTS1, RLC_TR_DATA_REQ, D_BCCH, 0, SndData, sizeof(SndData));
    SequenceDisp( "send 'SIB5-2' ");
};

/* Send Message: SIB5-3 */
{
    UCHAR SndData[ ] = {
        0x00, 0x06, 0x51, 0x52, 0x8b, 0x6d, 0x85, 0x00,
        0x21, 0x84, 0x4a, 0x05, 0x88, 0x03, 0x00, 0x00
        0x00, 0x00, 0x00, 0x00, 0x00, 0x00, 0x00, 0x00,
        0x00, 0x00, 0x00, 0x00, 0x00, 0x00, 0x00,
    };
    SIB_POS = 12;    ⎞
    SIB_REP = 32;    ⎠ C
    SndMessage( UNIT_BTS1, RLC_TR_DATA_REQ, D_BCCH, 0, SndData, sizeof(SndData));
    SequenceDisp( "send 'SIB5-3' ");
};
```

FIG. 10

TESTING APPARATUS AND TEST DISPLAY METHOD

CROSS-REFERENCE TO RELATED APPLICATIONS

This application is based upon and claims the benefit of priority from prior Japanese Patent Application No. 2013-012199, filed Jan. 25, 2013, the entire contents of which are incorporated herein by reference.

FIELD

The present invention relates to a method of displaying a transmission schedule of system information for use in a testing apparatus and a communication test for testing a mobile communication terminal.

BACKGROUND

In the development of mobile communication terminals such as cellular phones or mobile devices, it is tested whether a mobile communication terminal, which is currently being developed, can normally communicate with a base station in accordance with communication standards. To test the mobile communication terminal, a testing application for simulating the base station is utilized. This testing apparatus stores a prepared test scenario, which describes the operation sequence of the testing apparatus and communication sequence between the testing apparatus and the mobile communication terminal.

In the communication test for the mobile communication terminal, the testing apparatus is operated as a pseudo base station in accordance with the test scenario to communicate with the mobile communication terminal as a test target, thereby testing whether normal communication is performed.

In the mobile communication standards, system information is defined as important information to be sent from a base station to a mobile communication terminal. For instance, the system information includes base-station position information, peripheral cell information, and information for performing transmission control. The system information is cyclically broadcasted to mobile communication terminals per a predetermined number of frames, e.g., 128 frames.

In, for example, Wideband Code Division Multiple Access (W-CDMA), the system information is formed of a single Master Information Block (MIB) and a plurality of System Information Blocks (SIBs).

The MIB includes information for enabling each mobile communication terminal to detect the structure of the SIBs cyclically broadcasted in units of 128 frames, i.e., a transmission schedule indicating which SIB is transmitted in which frame, and also includes information for enabling each mobile communication terminal to detect a change in the system information.

The SIBs comprise different types of blocks labeled with, for example, SIB1, SIB2 and SIB3. SIB1 is used to inform each mobile communication terminal of common information shared between groups of cells. The other SIBs are used to inform each terminal of common information shared among cells.

The system information can include a plurality of SBs (scheduling blocks) as options. The SBs include SIB scheduling information, more specifically, SIB transmission scheduling information.

When transmitting the MIB, SIB and SB blocks, the base station allocates one block to every other frame in repetition made in units of 128 frames. These blocks are classified under the communication protocol into those fixed in allocation position and in the number of times of allocation in 128 frames, like the MIB, and those that are not fixed but can be arbitrarily set in allocation position and in the number of times of allocation.

It is a matter of course that the transmission of the system information is included in the above-mentioned test scenario. When performing the test, blocks are cyclically transmitted from the testing apparatus to each mobile communication terminal, based on the set transmission schedule.

Certain blocks in the system information have a high degree of freedom in setting, and hence it can be arbitrarily determined in which frames included in the 128 frames, these blocks should be transmitted or should not be transmitted. Further, since setting of the system information significantly influences the operation of the mobile communication terminal, there is a tester's demand for confirming the transmission schedule of the system information when a communication test is performed.

In the prior art, to confirm the system information transmission schedule, a tester reads the test scenario that will be executed by the testing apparatus, and extracts the portion of the scenario corresponding to the system information. Alternatively, the tester sees a displayed log associated with the communication performed in the communication test between the testing apparatus and a mobile communication terminal, and extracts the portion corresponding to system information from the log, as is disclosed in Jpn. Pat. Appln. KOKAI Publication No. 2009-147640.

However, in order to confirm the transmission schedule of the system information, it is necessary to perform complex work of searching 64 blocks in the 128 frames cyclically transmitted, for the above-mentioned portion from the test scenario or the displayed log.

For the purpose of imparting an instruction to the testing apparatus, the test scenario is described in the form of, for example, program source code written in Pearl language. Further, since the log is a record of all data exchanged between all layers of the protocol stack used in communication for debugging, the log and the test scenario both contain a great amount of information. Accordingly, when confirming the system information transmission schedule, a lot of time and labor are required for, in particular, the portion of the system information to be visually searched for by the tester. Further, since a large number of system information items exist, it is difficult to grasp the entire system information schedule.

SUMMARY

It is an object of the invention to provide a method of displaying a transmission schedule of system information for use in a testing apparatus and a communication test to enable a tester to confirm the schedule.

To attain the object, there is provided a testing apparatus for testing a mobile communication terminal (10), comprising:

a system information acquisition unit (51) configured to extract data associated with system information from at least one of a test scenario for operating the testing apparatus, and a communication log between the mobile communication terminal and the testing apparatus;

a display unit (41) configured to display a schedule of the system information; and a display controller (422) configured to create a transmission schedule based on the extracted data associated with system information, and to cause the display unit to display the transmission schedule as the schedule of the system information, the transmission schedule being written in a tabular form in which a block type of the system information is displayed at a position to which a transmission frame for transmitting the system information is allocated.

Since this testing apparatus extracts data associated with system information from a test scenario or log data, and displays the block types of system information items at positions to which frames for transmitting the system information items are allocated, a tester can grasp the system information schedule at a glance.

Further, the above testing apparatus may further comprise:

a communication unit (55) capable of transmitting a transmission message to the mobile communication terminal, and receiving a response message responding to the transmission message from the mobile communication terminal;

a layer processing unit (54) configured to process the transmission message and the response message for each of layers;

a scenario processing unit (52) configured to execute the test scenario, the test scenario causing the transmission message to be transmitted through the layer processing unit and the communication unit, and causing the testing apparatus to operate in response to the response message received through the communication unit and the layer processing unit; and a log data storing unit (57) configured to store log data indicating transmission of the transmission message between the layers, and log data indicating transmission of the response message, wherein the system information acquisition unit extracts the data associated with the system information from at least one of the scenario processing unit and the log data storing unit.

In the testing apparatus described above, the frame allocation positions are displayed in the tabular form in association with respective block types.

In this case, since the testing apparatus displays the frame allocated positions in association with block types, it can be easily understood in which frame position and which block type system information is transmitted.

Furthermore, in the testing apparatus described above, a plurality of information display fields may be arranged in rows and columns in the tabular form such that frame numbers are assigned in an increasing order to the respective rows or the respective columns, the information display fields displaying the display frame allocation positions in association with the respective block types.

In this case, since the testing apparatus displays a transmission schedule written in a tabular form in which a plurality of information display fields are arranged in rows and columns, the information display fields displaying the display frame allocation positions in association with the respective block types, it is not necessary to repeatedly scroll screens to see the entire table, namely, the table can be seen at a glance.

Also, in the above testing apparatus, the frame allocation positions of the transmission frame for transmitting the system information may be fixed at cyclical positions by communication standards.

In this case, since the testing apparatus displays a transmission schedule in a tabular form in which the information display fields including block types (such as MIB) of the system information are arranged in one or more rows or one or more columns, the frame allocation positions of transmission frame being fixed at cyclical positions, the system information transmission schedule can be seen at a glance in the form of a list.

Yet also, the frame cycle for transmitting the system information may be associated, for each block type of the system information, with an allocated position of the transmission frame in the frame cycle.

By virtue of this structure, the tester can efficiently confirm the transmission schedule of system information corresponding to each block type.

In this tabular form, information indicating the number of segment blocks may be added. The number of segment blocks indicates into what segment blocks the content (real data) in a block of a block type displayed in a block type field is divided for transmission.

To attain the above-mentioned object, in accordance with another aspect, there is provided a display method of displaying a transmission schedule of system information in a communication test for testing a mobile communication terminal (10) having a display unit, comprising:

displaying a schedule of the system information;

extracting data associated with system information from at least one of a test scenario for operating the testing apparatus, and a communication log between the mobile communication terminal and the testing apparatus; and creating a transmission schedule based on the extracted data associated with system information and displaying the transmission schedule on the display unit, the transmission schedule being written in a tabular form in which a block type of the system information is displayed at a position to which a transmission frame for transmitting the system information is allocated.

The invention constructed as the above enables the tester to easily confirm a transmission schedule of system information in a communication test.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing the configuration of a system including a testing apparatus according to an embodiment of the invention;

FIG. 4 shows a display example of the system information transmission schedule displayed in a first tabular form in the testing apparatus of the embodiment;

FIG. 5 shows a display example of the system information transmission schedule displayed in a second tabular form in the testing apparatus of the embodiment;

FIG. 6 shows another display example of the system information transmission schedule displayed in the first tabular form in the testing apparatus of the embodiment;

FIG. 7 shows another display example of the system information transmission schedule displayed in the second tabular form in the testing apparatus of the embodiment;

FIG. 8 shows a modification of the display example of the system information transmission schedule displayed in the first tabular form in the testing apparatus of the embodiment;

FIG. 9 shows another modification of the display example of the system information transmission schedule displayed in the first tabular form in the testing apparatus of the embodiment;

FIG. 10 shows a specific example of test scenario for extracting data associated with system information, used in the system shown in FIG. 1.

DETAILED DESCRIPTION

Figure 2:
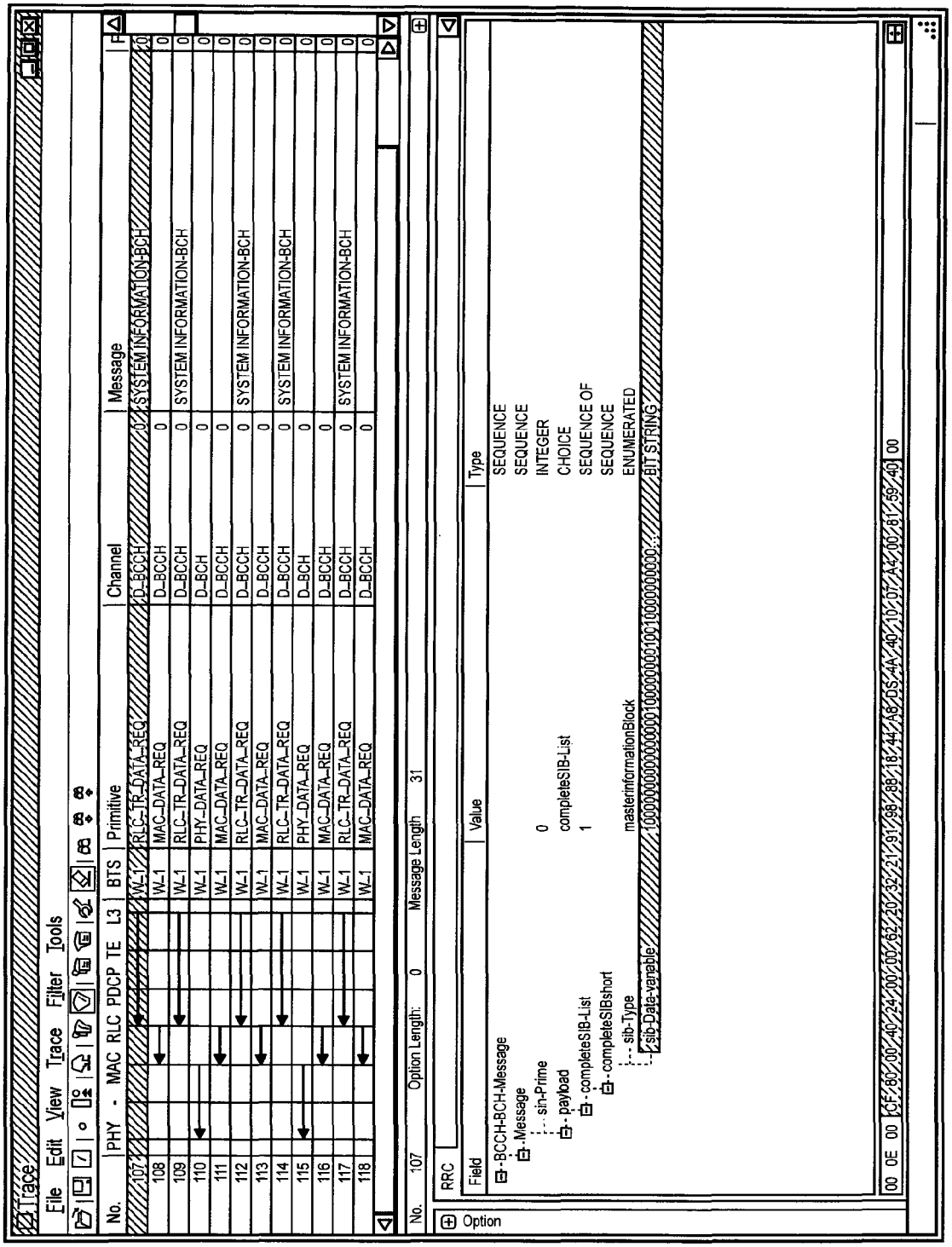
FIG. 2 shows a display example of specific log data on the display unit of the testing apparatus of FIG. 1.

Various embodiments and modifications of the embodiments will be described hereinafter with reference to the accompanying drawings.

Firstly, a description will be given of the configuration of a testing apparatus according to an embodiment of the invention.

[Configuration of the Testing Apparatus]

FIG. 1 is a block diagram showing the configuration of a system including a testing apparatus 50 according to the embodiment of the invention.

This system comprises a mobile communication terminal 10 and the testing apparatus 50.

The mobile communication terminal 10 is, for example, a mobile phone, a data communication terminal, or a semiconductor device for mobile communication used in the phone or communication terminal. Namely, the mobile communication terminal 10 is a target subjected to a communication test performed by the testing apparatus 50. The testing apparatus 50 functions as a pseudo base station to test the mobile communication terminal 10.

The testing apparatus 50 comprises an operation unit 43, a display unit 41 and a display control unit 42.

The operation unit 43 is operated by an operator including a tester, and is, for example, a keyboard, a mouse or a touch panel.

The display unit 41 displays a display screen generated by the display control unit 42. The display unit 41 is, for example, a liquid crystal panel.

The display control unit 42 generates a screen to be displayed on the display unit 41, and performs processing based on operation information input by the operator via the operation unit 43. The display control unit 42 comprises a log display controller 421, and a display controller 422 for controlling system information schedule display.

The log display controller 421 causes the display unit 41 to display log data (described later), stored in a log data storing unit 57, in accordance with a preset tabular form. FIG. 2 shows an example of specific log data displayed on the display unit 41. In this example, log records are displayed in a time-series manner on the upper portion of the display screen, and the content of the log record designated (selected) by the tester is displayed on the lower portion of the display screen.

The display controller 422 acquires a transmission schedule of system information from a system information acquisition unit 51, and causes the display unit 41 to display the acquired transmission schedule in a tabular form.

The operation unit 43, the display unit 41, the display control unit 42 and the log data storing unit 57 (described later) may be provided separate from the testing apparatus 50, and be connected to the testing apparatus 50. As a separate device including those units, a personal computer (PC), for example, is typically used.

The testing apparatus 50 further comprises the aforementioned system information acquisition unit 51, a scenario processing unit 52, a message processing unit 53, a layer processing unit 54, a log data generating unit 56, a log data storing unit 57 and a communication unit 55.

The system information acquisition unit 51 searches the test scenario acquired from the scenario processing unit 52 or the log data acquired from the log data storing unit 57, to thereby extract data associated with system information as setup information. The system information acquisition unit 51 provides the display controller 422 with the extracted data associated with the system information.

The scenario processing unit 52 acquires, from an external device (not shown), a scenario file as test scenario data for performing a communication test between the testing apparatus and the mobile communication terminal 10, and controls each element of the testing apparatus in accordance with the operation sequence or communication sequence for the testing apparatus described in the scenario file. Further, the scenario processing unit 52 instructs the message processing unit 53 to output a transmission message, and receives therefrom the processing result of a response message, thereby determining an operation corresponding to the processing result. The external device is, for example, a storing device (not shown) or the above-mentioned PC, which stores the scenario file.

In response to the instruction from the scenario processing unit 52, the message processing unit 53 generates a transmission message to be transmitted to the mobile communication terminal 10. Further, the message processing unit 53 processes the response message sent from the mobile communication terminal 10 via the communication unit 55 and the layer processing unit 54, and informs the scenario processing unit 52 of the processing result.

The transmission message used for the test scenario includes a transmission message associated with the control of the mobile communication terminal 10, and a transmission message that is not associated with the control of the mobile communication terminal 10. The transmission message associated with the control is, for example, system information. The transmission message that is not associated with the control is a message associated with each type of user data, such as video data, still image data, audio data or mail data.

The layer processing unit 54 processes the transmission and response messages for each layer. The layer processing unit 54 performs communication protocol processing corresponding to a preset communication protocol on the transmission message generated by the message processing unit 53, and outputs the resultant transmission message to the communication unit 55. Further, the layer processing unit 54 performs communication protocol processing on the response message received via the communication unit 55, and outputs the resultant response message to the message processing unit 53.

Whenever having performed processing for each layer, the layer processing unit 54 outputs their communication content as communication data to the log data generating unit 56.

The layer processing unit 54 performs, for example, W-CDMA communication protocol processing. In this case, the layers comprise a Radio Resource Control (RRC) layer, a Packet Data Control Protocol (PDCP) layer, a Radio Link Control (RLC) layer, a Media Access Control (MAC) layer, and a Physical (PHY) layer, which are arranged in this order from the highest level.

In the case of downlink, each layer performs processing unique thereto on the communication data received from its higher-level layer, and sends the resultant data to its lower-level layer. In contrast, in the case of uplink, each layer performs processing unique thereto on the communication data received from its lower-level layer, and sends the resultant data to its higher-level layer.

The log data generating unit 56 generates log data based on communication data indicating the communication content output from each layer of the layer processing unit 54. The log data includes a log header and communication data between the layers. The log data generating unit 56 comprises a time generating unit 561 and an ID generating unit 562. The time generating unit 561 generates time information for recording the time of the occurrence of a log. The ID generating unit 562 generates identifiers for identifying individual log records (log data items) generated. The identifiers are formed of sequential numbers from the start of the test.

The log data storing unit 57 stores the log data generated by the log data generating unit 56. The log data storing unit 57 is a large-capacity storing medium, such as a hard disk drive (HDD) or a flash memory. The log data storing unit 57 may be an external device separate from the testing apparatus 50.

The communication unit 55 can transmit a transmission message corresponding to the test scenario to the mobile communication terminal 10, and can receive therefrom a response message responding to the transmission message. More specifically, the communication unit 55 subjects the downlink data, output from the layer processing unit 54, to D/A conversion, modulation, frequency transform, etc., and transmits the resultant data to the mobile communication terminal 10. Further, the communication unit 55 subjects the uplink data, sent from the mobile communication terminal 10, to frequency transform, demodulation, A/D conversion, etc., and inputs the resultant data to the layer processing unit 54.

The testing apparatus 50 mainly comprises hardware, such as a Central Processing Unit (CPU), a Random Access Memory (RAM), and a Read Only Memory (ROM). In addition to or in place to the CPU, the testing apparatus 50 may incorporate a Programmable Logic Device (PLD), such as a Field Programmable Gate Array (FPGA), or incorporate a Digital Signal Processor (DSP), an Application Specific Integrated Circuit (ASIC), etc.

Further, the testing apparatus 50 may be realized by hardware only, or by both hardware and software. In the latter case, each function block of the testing apparatus 50 shown in FIG. 1 is realized by cooperation between a processor (hardware), such as the above-mentioned CPU, and the data (software) stored in, for example, the above-mentioned ROM or another storing device.

[Operation of the Testing Apparatus 50]

The operation of the testing apparatus 50 mainly associated with transmission schedule display of system information will now be described.

Figure 3:
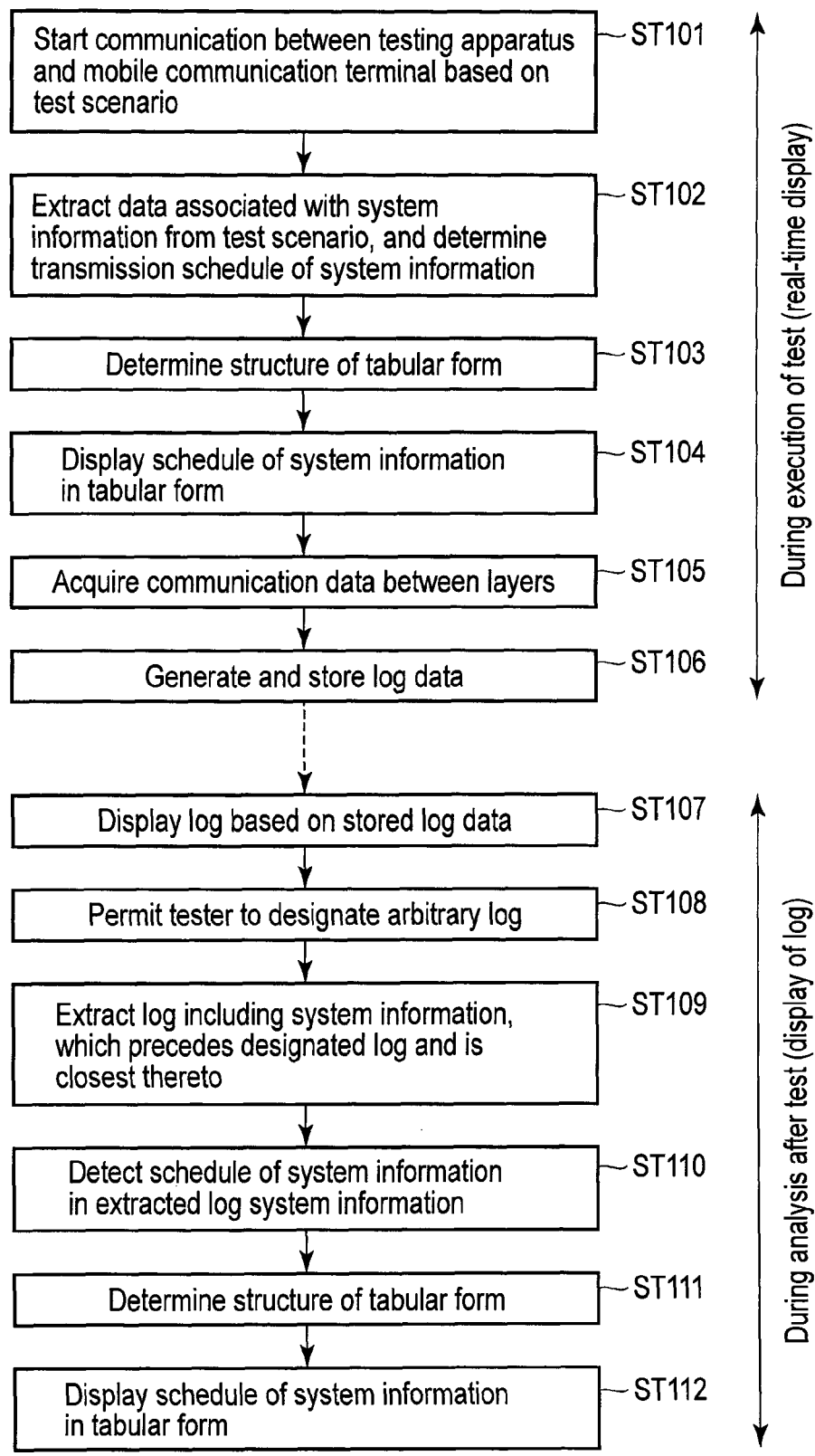
FIG. 3 is a flowchart for explaining the operation of the testing apparatus of FIG. 1 mainly associated with display of a transmission schedule of system information in the testing apparatus of FIG. 1.

FIG. 3 is a flowchart showing the operation of the testing apparatus 50 mainly associated with transmission schedule display of system information.

Processing of displaying a system information transmission schedule, included in the processing shown in the flowchart, is mainly divided into two modes. One of the two modes is "a real-time display mode" for displaying system information, to be transmitted to the mobile communication terminal 10, on the display unit 41 in real time during the execution of the communication test.

The other mode is "a log display mode" for displaying system information, already transmitted to the mobile communication terminal 10, on the display unit 41 during analyzing the result of the communication test, based on log data. The real-time mode and the log display mode will be hereinafter described successively in this order. Actually, however, these modes can be executed independently of each other.

When the tester has instructed the testing apparatus 50 to start a communication test, firstly the scenario processing unit 52 starts communication between the apparatus 50 and the mobile communication terminal 10 in accordance with the test scenario (step ST101).

If the tester has instructed the testing apparatus 50 to select the real-time display mode for displaying a transmission schedule of system information, the system information acquisition unit 51 acquires a currently executed test scenario from the scenario processing unit 52, and extracts, as setting information, data associated with the system information from the acquired test scenario. A specific example of the extraction will be described later. The system information acquisition unit 51 sends the extracted data to the display controller 422 (step ST102).

The tester may instruct the testing apparatus 50 to start the real-time display mode, when they need. Alternatively, presetting may be made such that when a communication test is started, the real-time display mode is automatically set.

Subsequently, the display controller 422 determines a tabular form (e.g., determines the numbers of rows and columns of a first tabular form) in which a transmission schedule of system information is displayed, based on predetermined setting information associated with tabular forms, or based on setting information associated with the tabular form included in the system information transmission schedule sent from the system information acquisition unit 51 (step ST103).

After that, the display controller 422 generates a transmission schedule table of system information in accordance with the tabular form determined in step ST103, based on the data associated with the system information output from the system information acquisition unit 51 (step ST104).

The above is the processing flow of the real-time display mode. The communication test itself will still be continued to execute the following steps.

For instance, during the execution of the communication test, the log data generating unit 56 acquires communication data between layers of the layer processing unit 54 (step ST105).

Subsequently, the log data generating unit 56 generates log data based on the acquired communication data, and the log data storing unit 57 stores the generated log data (step ST106).

The process steps ranging from steps ST102 to ST104 for real-time display of a system information transmission schedule are iteratively executed during the execution of the communication test. If the system information transmission schedule has been changed by the test scenario, the display content of the system information transmission schedule is updated to reflect the change in real time.

The steps ST105 and ST106 are also iteratively executed during the execution of the communication test, independently of the real-time display of the announcement transmission schedule.

After the communication test is finished, the tester instructs the testing apparatus 50 to display log data in order to analyze the test result. The log display controller 421 acquires log data from the log data storing unit 57 in response to the tester's instruction, and displays it on the display unit 41 (step ST107).

Thereafter, the tester selects an arbitrary log record from the display log data (step ST108).

Subsequently, in order to confirm the system information transmission schedule set when the selected (designated) log record was logged, the tester instructs the testing apparatus 50 to display the system information transmission schedule in the log display mode. Upon receiving this instruction via the operation unit 43 and the display control unit 42, the system information acquisition unit 51 searches for a log record preceding to the selected (designated) log record, thereby extracting a log record associated with the system information (MIB) and closest in time to the designated log record (step ST109).

Although in the above description, the tester instructs the testing apparatus 50 to display a transmission schedule of system information in a log display mode, this may be modified such that if the tester instructs display of the transmission schedule, the system information acquisition unit 51 recognizes that a log is now being displayed and causes a log display mode to be set.

After that, the system information acquisition unit 51 extracts, as setting information, the data associated with system information and included in the MIB log record extracted in step ST109, and sends the extracted data to the display controller 422 (step ST110). A specific example of extraction will be described later.

Subsequently, the display controller 422 determines, as in step ST103, a tabular form (e.g., determines the numbers of rows and columns of a first tabular form) in which a transmission schedule of system information is displayed, based on predetermined setting information associated with tabular forms, or based on setting information associated with the tabular form included in the system information transmission schedule sent from the system information acquisition unit 51 (step ST111).

Lastly, the display controller 422 creates a table showing a system information transmission schedule in accordance with the tabular form determined in step ST111, and causes the display unit 41 to display the table (step ST112).

As described above, in the testing apparatus 50 of the embodiment, a system information transmission schedule is displayed on the display unit 41 to enable the tester to confirm the schedule during the communication test and even after the communication test is finished.

[Method of Displaying a System Information Transmission Schedule]

A method of displaying a system information transmission schedule will now be described.

In the testing apparatus 50 of the embodiment, a transmission schedule of system information is displayed in a tabular form that enables the tester to easily confirm the schedule. For this purpose, a first tabular form and a second tabular form are prepared. These formats will be described.

(First Tabular Form)

Firstly, the outline of the first tabular form will be described.

In the first tabular form, in order to enable the order of broadcasting of frames to be intuitively understood, frame numbers indicating the allocation positions of frames, in which system information items are transmitted, are made to correspond to the block types of the respective system information items. Each area displaying a frame number in association with the block type of a system information item will hereinafter be referred to as an "information display field."

In W-CDMA, since system information is cyclically broadcasted in units of 128 frames, and one data block is allocated to every other frame, the number of information display fields is 64.

If all 64 information display fields are displayed in one row or one column, it is difficult to refer to these fields without scrolling operation, because of, for example, restriction on screen size. In light of this, in the embodiment, all information display fields are displayed in rows and columns to make the entire table fall within the screen, thereby enabling the tester to simultaneously see all display fields on the screen.

Further, in W-CDMA, an MIB is allocated to the first frame (with a frame number of 0) of the 128 frames, and is transmitted in an 8-frame cycle. In the embodiment, the numbers of the rows and columns of the first tabular form are determined in view of the transmission cycle of the MIB.

More specifically, in the first tabular form, ascending frame numbers are allocated along each row. Further, the number of information display fields that correspond to the frame numbers in one row (or one column) is set to a multiple of n/2 (where n is the number of frames corresponding to one transmission cycle of the MIB). For instance, since the frame number corresponding to one transmission cycle of the MIB is 8, the number of information display fields that correspond to one row (or one column) is set to a multiple of 4. As a result, each information display field, in which the MIB should be set under the communication protocol, is positioned in a particular row (or column), thereby enhancing the viewability of the system information transmission schedule.

Referring then to FIG. 4, a description will be given of a specific example of a system information transmission schedule displayed in the first tabular form.

In the specific example of the first tabular form, a display field (hereinafter, a "frame number field") displaying a frame number (Frame No.), and a display field (hereinafter, a "block type field") displaying the block type (Block Type) of the system information constitute one information display field 100. The information display field 100 serves as each element of a matrix. In the first tabular form, the number (the number of columns) of the information display fields 100 corresponding to one row is 8, and the number (the number of rows) of the information display fields 100 corresponding to one column is also 8. Further, in the first tabular form, every other ascending frame numbers are allocated along each row. Namely, frame number 0 is allocated to the information display field 100 located at the left end of the uppermost row of the matrix, and frame numbers 2, 4, 6, 8, 10, 12 and 14 are sequentially allocated to the remaining seven information display fields 100 of the same row, beginning with the leftmost one. Similarly, frame numbers 16, 18, 20, 22, 24, 26, 28 and 30 are allocated to the information display fields 100 of the next row. Thus, frame number 126 is allocated to the information display field 100 located at the right end of the lowermost row.

In the first tabular form, "MIB" is allocated as the block type in the block type field of each of the first and fifth information display fields 100 of each row from the left. As a result, enhancement of efficiency can be expected when confirming an MIB transmission schedule with its transmission frames cyclically fixed under the communication protocol.

Further, even efficiency for confirming a transmission schedule for another block type from the positional relationship relative to the MIB is enhanced. For instance, in a specific example of the first tabular form, it is assumed that SB1 is allocated in units of 16 frames to a frame subsequent to the frame to which the MIB is allocated. Such a block transmission schedule can be also detected easily.

Furthermore, information display fields 100 for particular block types may be displayed recognizable by, for example, displaying these fields in different colors. In this example, at least the background color or characters in the information display fields 100 with block types "MIB," "SB1," "SIB11," and "SIB19" are displayed in the same color for the same block type. The tester may arbitrarily set to which block type and which color should be allocated. In this case, colors do not always have to be allocated to all block types.

Color coding may be performed so that an information display field for a block type whose allocation position is determined under the communication protocol can be discriminated at a glance from an information display field for a block type whose allocation position can be set arbitrarily.

(Second Tabular Form)

A second tabular form will hereinafter be described.

The second tabular form is used to display a transmission schedule of system information in one information display field 200 for each block type, using the transmission cycle, the number of divisional blocks, and the allocation position.

FIG. 5 shows a specific example of a transmission schedule obtained by expressing, in a second tabular form, the transmission schedule of the first tabular form shown in FIG. 4.

As shown, each information display field 200 in the second tabular form comprises a block type field displaying the block type (Block Type) of system information, a transmission cycle (SIB#REP) display field, a block segment count (SEG#COUNT) display field, and an allocation position (SIB#POS) display field. Accordingly, the second tabular form is formed of a plurality of information display fields 200 corresponding to the block types of system information items.

The transmission cycle (SIB#REP) indicates per what number of frames, the block data (indicating a block type) displayed in the block type field is cyclically transmitted.

The block segment count (SEG#COUNT) indicates into what number of segments, the content (real data) of the block data indicating the block type displayed in the block type field is divided when it is transmitted.

The allocation position (SIB#POS) indicates the ordinal position in the cycle defined by the transmission cycle (SIB#REP), in which the block data indicating the block type displayed in the block type field is transmitted. It should be noted that the value of the allocation position (SIB#POS) does not indicate the frame count, but indicates half the frame count. This is because the blocks (block data items) of the system information are transmitted in a cycle of two frames.

In the case of, for example, an information display field 200 with block type "MIB" that is included in the specific example of the second tabular form shown in FIG. 5, the transmission cycle (SIB#REP) is set to 8, the block segment count (SEG#COUNT) is set to 1, and the allocation position (SIB#POS) is set to 0.

This indicates that MIB is transmitted in a cycle of eight frames, and its content is not divided but is carried by one frame as the first frame (with frame number 0) among the eight frames.

Further, in the case of an information display field 200 with block type "SIB5/SIB5 bit," the transmission cycle (SIB#REP) is set to 32, the block segment count (SEG#COUNT) is set to 3, and the allocation positions (SIB#POS) are set to 5, 6 and 7.

This indicates that system information with the block type "SIB5/SIB5 bit" is transmitted in a cycle of 32 frames, its content is divided into three segments, and the three segments are carried by sixth, seventh and eighth frames (with frame numbers 5, 6 and 7) among the 32 frames, respectively.

By thus displaying the transmission schedule of system information per each block type, using one information display field 200 showing a transmission cycle, block segment count, and allocation position(s), the transmission schedule can be confirmed from a view different from that of the first tabular form. For instance, the transmission schedule of system information corresponding to each block type can be efficiently confirmed.

The display of the block segment count in the second tabular form shown in FIG. 5 is not limited to the second tabular form, if it is intended to know the allocation positions of the block segments.

Further, also in the second tabular form, information display fields 200 for particular block types may be displayed recognizable by, for example, displaying these fields in different colors. In this case, by also considering confirmation performed during the time including switching of display between the first and second tabular forms, it is preferable to match the relationship in block type and color between the first and second tabular forms.

Yet further, the tables of the first and second formats can be selectively displayed in accordance with an instruction from the tester, or can be simultaneously displayed on the screen.

[Display Example of Another Transformation Schedule]

FIG. 6 shows a specific example where another transmission schedule is displayed in the first tabular form, and FIG. 7 shows a specific example where this transmission schedule is displayed in the second tabular form.

These examples differ from those shown in FIGS. 4 and 5 in the transmission schedules of system information items with block types "SIB11" and "SIB19."

In the examples of FIGS. 4 and 5, the block segment count indicated by "SEG#COUNT" is 9 in both blocks of the system information items with block types "SIB11" and "SIB19." Namely, each block is divided into nine segments. In contrast, in the examples of FIGS. 6 and 7, the blocks of the system information items with block types "SIB11" and "SIB19" are divided into six segments and three segments, respectively.

These differences are expressed as the values of the block segment count (SEG#COUNT) in the second tabular form in FIG. 7. Further, frames with no blocks may occur due to, for example, a change in block segment count (SEG#COUNT). From the second tabular form, it is difficult to confirm the frames with no blocks at a glance. However, the first tabular form is constructed as shown in, for example, FIG. 6 such that the block type fields in the information display fields (marked with thick frames) corresponding to the frames with no blocks are kept blank or indicated by a mark so as to enable the tester to easily detect the fact that those frames carry no block data.

As described above, the first and second tabular forms have different advantages in visibility for confirming the schedule content. By virtue of this structure, the efficiency of transmission schedule confirming operation can be enhanced by selectively or simultaneously displaying the tabular forms.

[Modifications of Tabular Forms]

Modifications of the first and second tabular forms will now be described.

FIG. 8 shows modifications of the first tabular form.

(First Modification of First Tabular Form)

In the first tabular form having a matrix structure, shown in FIG. 4, although each information display field 100 is an element of the matrix, the frame number field and block type field of each information display field 100 are arranged longitudinally, which makes it difficult to recognize the boundary between matrix elements. In light of this, in the first modification, a space 102 is provided between each pair of adjacent rows of the matrix that includes the information display fields 100 as elements. This enables the tester to easily detect the boundaries.

In addition, to facilitate detection of the boundaries, the type and/or color of the lines that separate the rows may be made different from that of the lines that separate the frame number fields from the block type fields.

(Second Modification of First Tabular Form)

In the above-described examples of the first tabular form, every other ascending frame numbers are allocated along each row. In contrast, in a second modification, every other ascending frame numbers are allocated along each column.

FIG. 9 shows the second modification of the first tabular form.

In the first tabular form of the second modification, the frame number field and the block type field incorporated in each information display field 100 are linearly arranged along a row. The number (the number of rows) of information display fields 100 corresponding to one column is "16," and the number (the number of columns) of information display fields 100 corresponding to one row is "4."

In the first tabular form of the second modification, every other ascending frame numbers are allocated along each column. Namely, frame number 0 is allocated to the uppermost information display field 100 located in the leftmost column, and frame numbers 2, 4, 6, 8, 10, 12, 14, 16, 18, 20, 22, 24, 26, 28 and 30 are allocated to the other fifteen information display fields 100 located in the leftmost column. Similarly, frame numbers 32, 34, 36, 38, 40, 42, 44, 46, 48, 50, 52, 54, 56, 58, 60 and 62 are allocated, sequentially from the above, to the information display fields 100 located in the subsequent column. Similar frame number allocation is performed on the other columns. As a result, frame number 126 is allocated to the lowest information display field 100 in the rightmost column.

Since in the above tabular form, the columns are constructed in units of 32 frames, the block type "MIB" is uniformly displayed in the first, fifth, ninth and thirteenth block type fields (of each information display field 100) of each column from the above. In addition, in the above tabular form, system information items, such as "SB1," "SIB1," "SIB5" and "SIB5/SIB5bis," are also laterally uniformly arranged for respective block types, which makes it easy to confirm the system information.

Further, in order to prevent the boundaries between the columns from being indistinguishable from each other because of arrangement of the frame number field and block type field of each information display field 100 along a row, a space 102 is provided between each pair of adjacent columns. Also in this tabular form, color coding may be performed for each block type of system information.

(Other Modifications)

In the above embodiment and modifications, the testing apparatus 50 determines a tabular form (the numbers of rows and columns, and the like) when a system information transmission schedule is displayed in the tabular form, based on predetermined setting information associated with tabular forms, or setting information associated with the tabular form included in the transmission schedule.

The predetermined setting information associated with tabular forms may be fixed in the system in view of restriction under the communication protocol. Alternatively, the tester may determine the setting information in light of the repetition cycle of, for example, target system information block data.

Further, the testing apparatus 50 may be modified to permit the tester to input a tabular form (e.g., the numbers of rows and columns) different from a displayed transmission schedule tabular form, thereby changing the transmission schedule tabular form in a real-time manner.

Also, in the above-described display environment of the transmission schedule tabular form, a key for accessing the detailed content of system information of each block type may be provided. When this key has been operated in a state in which the tester has selected an arbitrary information display field, the testing apparatus 50 displays the detailed content of the system information of the block type displayed in the block type field in the selected information display field.

[Specific Example of Extracting Data Associated with System Information from Test Scenario]

A description will be given of a specific example in which the system information acquisition unit 51 extracts data associated with system information from a test scenario in a real-time display mode. FIG. 10 shows a case where the system information acquisition unit 51 extracts, as setting information, data associated with system information from an acquired test scenario. This figure shows the part in the test scenario associated with setting of SIB5. The setting of SIB5 is described, divided into three portions (SIB5-1, SIB5-2 and SIB5-3).

In SIB5-1, as described in description A, SIB#POS (allocation position) is 6, and SIB#REP (transmission cycle) is 32. In SIB5-2, as described in description B, SIB#POS is 10, and SIB#REP is 32. In SIB5-3, as described in description C, SIB#POS is 12, and SIB#REP is 32.

From the above, as information associated with the transmission schedule of system information SIB5, information indicating that SIB5 is divided into three segment blocks, each segment block is transmitted in a cycle of 32 frames, and the three segment blocks are transmitted using frames #6, #10 and #12 included in the 32 frames is extracted from the test scenario.

[Specific Example of Extracting Data Associated with System Information from Log Data]

Figure 11:
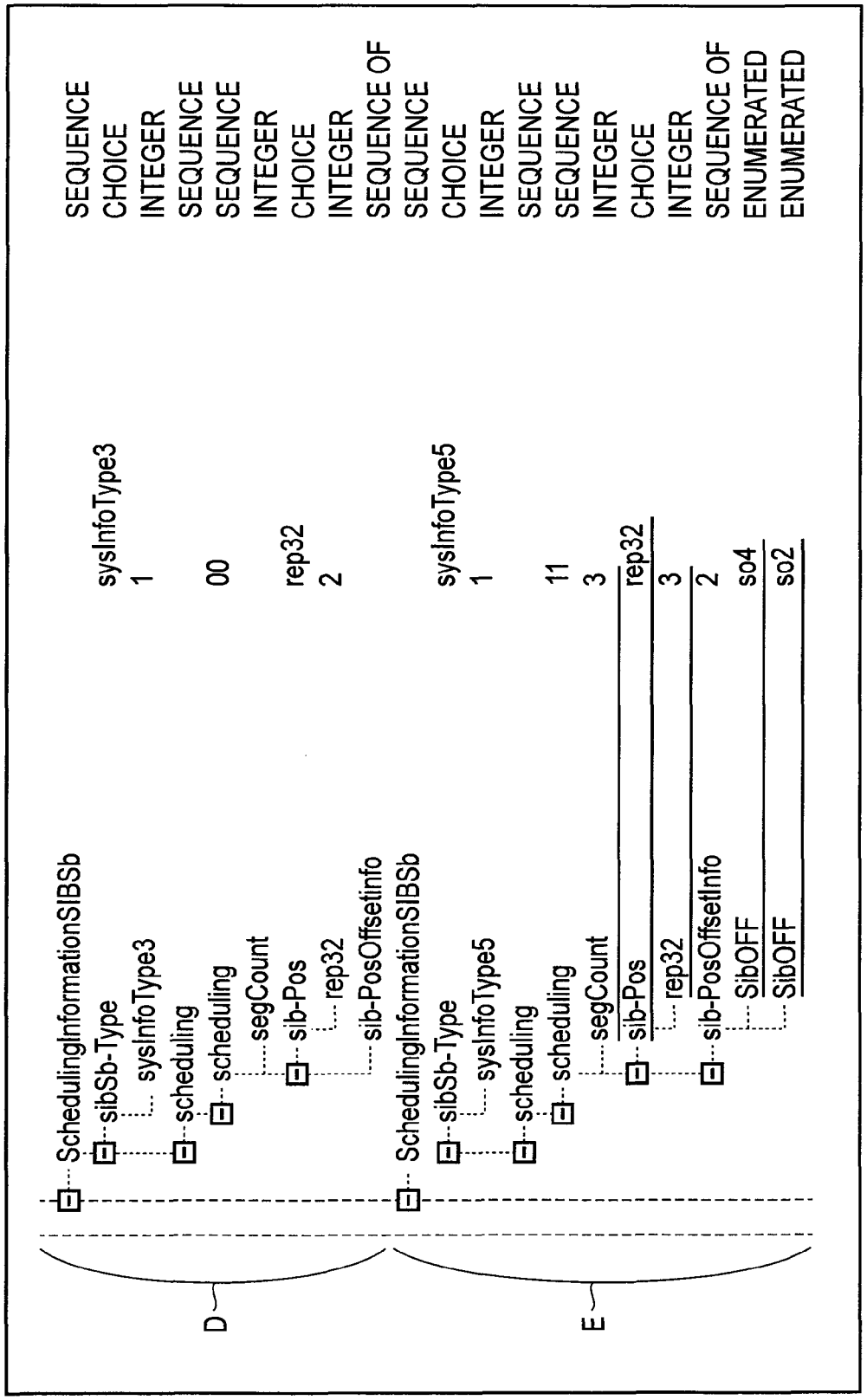
FIG. 11 shows a specific example of log data for extracting data associated with the system information, used in the system shown in FIG. 1.

A description will be given of a specific example in which the system information acquisition unit 51 extracts data associated with system information from log data. FIG. 11 shows log data as a specific example of data extracted as setting information by the system information acquisition unit 51 from MIB transmission log data that is located immediately before the log data designated by a tester.

The data indicated by D in the upper portion indicates the structure content of SIBS, and the data indicated by E in the lower portion indicates the structure content of SIB5. The underlined items and their values indicated in the structure content of SIB5 mean the following:

"segCount: 3" means that system information SIB5 is transmitted, divided into three segment blocks. "sib-Position: rep32" means that the transmission cycle of SIB5 is 32 frames.

"rep32: 3" means that the first segment block is transmitted using the 3rd frame of the 32 frames, namely, frame #6.

"SibOFF: so4" means that the second segment block is transmitted, using the frame displaced by four frames from the transmission position of the first segment block, i.e., using frame #10.

"SibOFF: so2" means that the third segment block is transmitted, using the frame displaced by two frames from the transmission position of the second segment block, i.e., using frame #12.

Since as described above, MIB contains information associated with the structure of SIB, the system information acquisition unit 51 can extract data associated with the transmission schedule of the system information by analyzing the transmission log data of MIB.

[Auxiliary Matters]

In the above descriptions, "frame" is used as a transmission schedule unit for system information, since W-CDMA is employed as an example. However, when the present invention is applied to LTE, it is sufficient if "frame" is replaced with "sub-frame" as the schedule unit of LTE.

Further, the invention is not limited to the above-described embodiments, but may well be modified in various ways without departing from the scope.

What is claimed is:

1. A testing apparatus for testing a mobile communication terminal (10), comprising:
    a system information acquisition unit (51) configured to extract data associated with system information from at least one of a test scenario for operating the testing apparatus, and a communication log between the mobile communication terminal and the testing apparatus;
    a display unit (41) configured to display a schedule of the system information; and
    a display controller (422) configured to create a transmission schedule based on the extracted data associated with system information, and to cause the display unit to display the transmission schedule as the schedule of the system information, the transmission schedule being written in a tabular form in which a block type of the system information is displayed at a position to which a transmission frame for transmitting the system information is allocated.

2. The testing apparatus according to claim 1, further comprising:
    a communication unit (55) capable of transmitting a transmission message to the mobile communication terminal, and receiving a response message responding to the transmission message from the mobile communication terminal;
    a layer processing unit (54) configured to process the transmission message and the response message for each of layers;
    a scenario processing unit (52) configured to execute the test scenario, the test scenario causing the transmission message to be transmitted through the layer processing unit and the communication unit, and causing the testing apparatus to operate in response to the response message received through the communication unit and the layer processing unit; and
    a log data storing unit (57) configured to store log data indicating transmission of the transmission message between the layers, and log data indicating transmission of the response message,
    wherein the system information acquisition unit extracts the data associated with the system information from at least one of the scenario processing unit and the log data storing unit.

3. The testing apparatus according to claim 1, wherein the frame allocation positions are displayed in the tabular form in association with respective block types.

4. The testing apparatus according to claim 3, wherein a plurality of information display fields are arranged in rows and columns in the tabular form such that frame numbers are assigned in an increasing order to the respective rows or the respective columns, the information display fields displaying the display frame allocation positions in association with the respective block types.

5. The testing apparatus according to claim 4, wherein the frame allocation positions of the transmission frame for transmitting the system information are fixed at cyclical positions by communication standards.

6. The testing apparatus according to claim 1, wherein a frame cycle for transmitting the system information is associated, for each block type of the system information, with an allocated position of the transmission frame in the frame cycle.

7. A display method of displaying a transmission schedule of system information in a communication test for testing a mobile communication terminal (10) having a display unit, comprising:
    displaying a schedule of the system information;
    extracting data associated with system information from at least one of a test scenario for operating the testing apparatus, and a communication log between the mobile communication terminal and the testing apparatus; and
    creating a transmission schedule based on the extracted data associated with system information and displaying the transmission schedule on the display unit, the transmission schedule being written in a tabular form in which a block type of the system information is displayed at a position to which a transmission frame for transmitting the system information is allocated.

8. The display method according to claim 7, further comprising:
    executing the test scenario for operating the testing apparatus to transmit a transmission message to the mobile communication terminal, and for operating the testing apparatus in response to a response message received from the mobile communication terminal;
    transmitting the transmission message to the mobile communication terminal;
    receiving the response message to the transmission message from the mobile communication terminal;
    processing the transmission message and the response message for each of layers storing log data indicating transmission of the transmission message between the layers, and log data indicating transmission of the response message,
    wherein the extracting data includes extracting the data associated with the system information from at least one of the scenario processing unit and the log data storing unit.

9. The display method according to claim 7, wherein the frame allocation positions are displayed in the tabular form in association with respective block types.

10. The display method according to claim 9, wherein a plurality of information display fields are arranged in rows and columns the tabular form such that frame numbers are assigned in an increasing order to the respective rows or the respective columns, the information display fields displaying the display frame allocation positions in association with the respective block types.

11. The display method according to claim 10, wherein the frame allocation positions of the transmission frame for transmitting the system information being fixed at cyclical positions by communication standards.

12. The display method according to claim 7, wherein a frame cycle for transmitting the system information is associated, for each block type of the system information, with an allocated position of the transmission frame in the frame cycle.

* * * * *